United States Patent [19]

Miwa et al.

[11] Patent Number: 4,851,304
[45] Date of Patent: Jul. 25, 1989

[54] ELECTRODE SUBSTRATE FOR FUEL CELL AND PROCESS FOR PRODUCING THE SAME

[75] Inventors: Kishio Miwa; Kazuharu Shimizu; Hiroaki Fukui, all of Shiga, Japan

[73] Assignee: Toray Industries, Inc., Tokyo, Japan

[21] Appl. No.: 179,286

[22] Filed: Apr. 8, 1988

[30] Foreign Application Priority Data

Apr. 10, 1987 [JP] Japan ................................ 62-88129

[51] Int. Cl.⁴ ............................................ H01M 4/96
[52] U.S. Cl. ........................................ 429/40; 429/42; 429/44
[58] Field of Search ................. 429/40, 41, 42, 44; 428/304.4, 408, 218; 204/294

[56] References Cited

U.S. PATENT DOCUMENTS

| 4,185,145 | 1/1980 | Breault | 429/34 |
| 4,369,104 | 1/1983 | Beckley | 429/44 |
| 4,759,989 | 7/1988 | Abe et al. | 429/210 X |

FOREIGN PATENT DOCUMENTS

| 53-18603 | 6/1978 | Japan . |
| 53-43920 | 11/1978 | Japan . |
| 57-129814 | 8/1982 | Japan . |
| 57-166354 | 10/1982 | Japan . |
| 58-68881 | 4/1983 | Japan . |
| 60-44963 | 3/1985 | Japan . |

Primary Examiner—Anthony Skapars
Attorney, Agent, or Firm—Birch, Stewart, Kolasch & Birch

[57] ABSTRACT

A porous electrode substrate for fuel cell and a process for producing the same, which contains 35 to 60% carbonized resin by weight, and has pores with a mean pore size of 20 to 60 μm and a porosity of 60 to 80%, and a compression ratio of 20% or less. Chopped carbon fibers with fiber lengths of 3 to 20 mm and fiber diameters of 4 to 9 μm are dispersed in random directions within substantially 2-dimensional plane, and bound with an organic binder to make an carbon fiber mat. The carbon fiber mat is impregnated with a resin to make prepreg and hot pressing the prepreg under a temperature of 120° to 200° C. and a pressure of 2 to 10 kg/cm². Then, the press molded product is carbonized by heat treatment under a temperature of 1300° to 3000° C. in an inert atmosphere or in vacuum to obtain an electrode substrate excellent in various characteristics such as gas permeability, flexural strength, compression strength, etc. Further, for improvement of electroconductivity, it is preferable to use a mixture of a curable resin and a non-curable resin as the resin impregnated into the carbon fiber mat.

5 Claims, 5 Drawing Sheets

ELECTRODE SUBSTRATE FOR FUEL CELL AND PROCESS FOR PRODUCING THE SAME

BACKGROUND OF THE INVENTION

This invention relates to an electrode substrate suitable for fuel cell, particularly phosphoric acid fuel cell and a process for producing the same.

Phosphoric acid fuel cell is constituted of a maxtrix layer impregnated with a phosphoric acid solution which is an electrolyte, and positive and negative electrodes sandwiching the matrix layer from both surfaces. Electrodes are constituted by forming catalyst layers on the surfaces of electrode substrates which are contacted with the matrix layer.

The electrode substrates to be used for such phosphoric acid fuel cell are demanded to have various electrical, chemical and mechanical characteristics, including high electroconductivity as a matter of course, chemical stability at high temperatures, excellent gas permeability, and also high flexural strength, etc.

More specifically, the electrode substrate for phosphoric acid fuel cell, since it is required to have the function to feed a fuel gas (hydrogen gas, etc.) or oxidative gas (air or oxygen gas) to the catalyst layer adjacent thereto, is first required to have basically high gas permeability. Gas permeability of the electrode substrate is given by porous property of the electrode substrate, namely by the electrode substrate having interconnected pores, and gas permeability performance is determined by the pore size and porosity, etc. If interconnected pores having large pore sizes are formed in the electrode substrate for imrovement of gas permeability of the electrode substrate, the phosphoric acid solution will be readily scattered therethrough, whereby excessive consumption of the solution occurs. On the contrary, if interconnected pores having small pore sizes are formed, the phosphoric acid solution penetrate to the electrode substrate from matrix layer through the capillary phenomenon, whereby its gas permeability may be lowered or the cell performance may be lowered due to shortage of the electrolyte in the matrix layer. Thus, setting of the pore size and porosity within optimum value ranges is one of important matters which influences electrode performances.

Also, a phosphoric acid fuel cell, in order to obtain a power enough to be provided for commercial use, is stacked up with a large number of cell units shaped in flat plate, and therefore the electrode substrate must have high mechanical strength, particularly flexural strength. High mechanical strength is also necessary for performing easily workings of wetproof treatment of the electrode substrate or coating of the catalyst, assembling working of cell units, etc. This demand for mechanical strength becomes greater as the substrate area of the fuel cell becomes larger. Further, for improvement of electroconductivity between the contacted surfaces of the respective cell units, the stacked cell units are clamped with a given compressive force in the stacking direction. Accordingly, the electrode substrate of each unit must have uniform characteristics relative to compression. If the amounts to be compressed when a constant compressive force is permitted to act differ depending on the electrode substrates of the respective units, the characteristics of gas permeability of the electrode substrates of the respective cell units will be also different, whereby variance occurs in cell characteristics between the units, and the heights of the respective units become irregular.

For the electrode substrate of a phosphoric acid fuel cell comprising a large number of cell units stacked up, the surface roughness is also an important problem. More specifically, the electrode of a phosphoric acid fuel cell comprises a catalyst layer consisted of platinum or platinum alloys supported on a carrier coated on the electrode substrate surface, and the coating thickness of the catalyst is generally 50 to 500 $\mu$m. Therefore, when the surface roughness of the electrode substrate is great, planar variance of the coated amount of the catalyst is not negligible and power generation irregularity occurs to cause lowering in power generation efficiency. Also, for performing practical power generation, a large number of cell units may be stacked up electrically in series. In this case, since an electroconductive gas separator is sandwiched between the adjacent unit cells, one surface of the electrode substrate is assembled so as to be contacted with the gas separator. If the surface of the electrode substrate is rough, the contact between the substrate and the gas separator becomes insufficient, whereby electrical resistance at the contacted surface is increased to lower power generation efficiency.

As the substrate constituting the electrode of fuel cell as described above, there have been known in the art those comprising short carbon fibers dispersed in random directions within substantially 2-dimensional plane bonded to each other with carbonized or graphitized resin by means of paper making, etc., as disclosed in the literatures such as Japanese Patent Publications Nos. 53-18603 and 53-43920, Japanese Laid-Open Patent Publications Nos. 57-129814, 57-166354 and 60-44963 and others.

All of these substrates of the prior art described in these literatures had one advantage and one shortcoming in gas permeability, mechanical strength, compressive characteristic, etc. subh that some are good in gas permeability but involve a problem in mechanical strength, or on the contrary others are high in mechanical strength but inferior in gas permeability, etc. Thus, no electrode substrate has been obtained, which can sufficiently satisfy the requirements in all of these characteristics.

On the other hand, Japanese Laid-Open Patent Publication No. 58-68881 discloses a method for obtaining an electrode substrate all at once according to molding fabrication of a mixture of chopped carbon fibers and a carbonizable resin without recourse to paper making. Since this method relies on molding fabrication, it is necessary to use choped carbon fibers with extremely short fiber length of, for example, 1 mm or less, and threfore mechanical strength is remarkably inferior as compared with the substrate prepared by the paper making method, whereby there is the problem that handling of the electrode becomes difficult in workings of wetproof treatment of the electrode substrate, coating of the catalyst, assembling of cell units, etc. as described above.

OBJECTS AND SUMMARY OF THE INVENTION

Primary object of the present invention is to provide a substrate and a process for producing the same, which is suitable for constituting the electrode of a fuel cell, particularly the electrode of a phosphoric acid fuel cell, having excellent chemical stability at high temperatures and electroconductivity, as well as various excellent characteristics such as gas permeability, flexural strength, compressive characteristic, etc., and yet being well balanced in these various characteristics.

Another object of the present invention is to provide an electrode substrate for fuel cell and a process for producing the same, which has higher electroconductivity and yet excellent mechanical strength.

Still another object of the present invention is to provide an electrode substrate with smooth surfaces and a process for producing the same, which is improved in power generation efficiency by precluding power generation irregularity and electrical contact inferiority caused by the surface roughness of electrode substrate.

In accordance with the present invention, there is provided a porous electrode substrate for fuel cell comprising short carbon fibers dispersed in random directions within substantially 2-dimensional plane and carbonized resin for mutually bonding the carbon fibers. The individual fiber of the carbon fibers has a diameter of from 4 to 9 $\mu$m and a length of from 3 to 20 mm. The content of the carbonized resin is in the range of from 35 to 60% by weight, and the substrate of the present invention has pores with a mean pore size of from 20 to 60 $\mu$m and a porosity of from 60 to 80%, and a compression ratio not more than 20%.

Preferably, a surface of the substrate of the present invention has a surface roughness of not more than 100 $\mu$m, defined as the maximum undulation of the rolling circle tracing the shape of the substrate surface.

The electrode substrate of the present invention is produced according to the following process. Chopped carbon fibers each of which has a length of from 3 to 20 mm and a diameter of from 4 to 9 $\mu$m are mixed by stirring together with a dispersant containing an organic binder, and then paper is made from the mixture to obtain a carbon fiber mat. Alternatively, chopped carbon fibers are mixed by stirring together with a dispersant containing no organic binder, after that paper is made from the mixture, and then the paper obtained is treated with an organic binder to obtain a carbon fiber mat. The carbon fiber mat is impregnated with a resin to obtain a prepreg. After the impregnation, the prepreg is hot pressed under a temperature of from 120° to 200° C. and a pressure of 2 to 10 kg/cm² to obtain a molded substrate. Then, the molded substrate is heat treated to carbonize the resin under a temperature of from 1300° to 3000° C. in an inert atmosphere or vacuum atmosphere to obtain an electrode substrate excellent in gas permeability, flexural strength, compression strength, etc.

Preferably, the carbon fiber mat is dried by heating, and the amount of the organic binder attached to the carbon fiber mat after completion of the drying step is in the range of from 5 to 30% by weight based on the total weight of the carbon fiber mat.

Also, in the hot pressing step, if desired, a plural number of sheets of the prepreg are laminated and subjected to hot pressing in the hot pressing step.

The resin impregnated into the carbon fiber mat may contain a resin which is curable in the subsequent hot pressing step and a resin which is not curable in the subsequent hot pressing step, and the mixing ration may be preferably 10 to 500 parts by weight of the non-curable resin based on 100 parts by weight of the curable resin. The curable resin is at least one selected from the group consisting of resol type phenolic resins, polyphenyl quinoxalines and thermosetting polyimides, and the non-curable resin is at least one selected from the group consisting of novolak type phenolic resins, pitch, furan resins, epoxy resins and polyphenylene oxides.

The above and other objects, features and advantages of the present invention will become more apparent from the ensuing detailed description taken in conjunction with the accompanying drawings.

DETAILED DESCRIPTION

Figure 1:
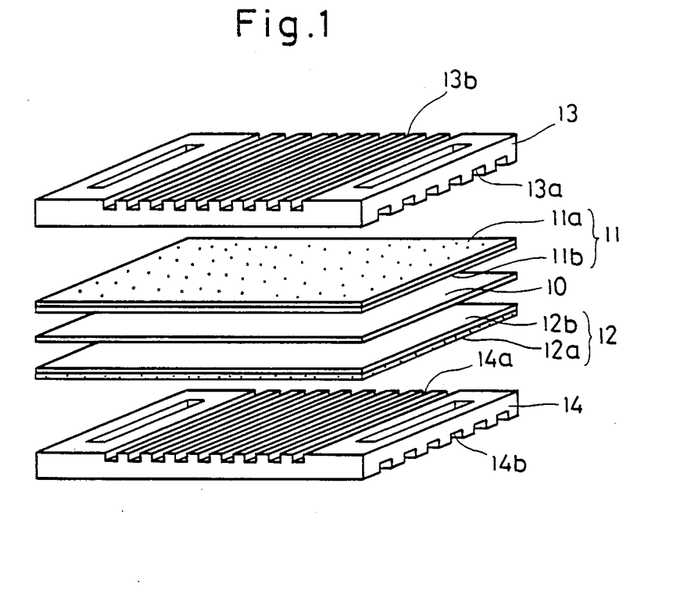
FIG. 1 is an exploded perspective view showing the cell structure of a phosphoric acid fuel cell, particularly a flat plate electrode fuel cell for which the electrode substrate of the present invention is applied.
Figure 2:
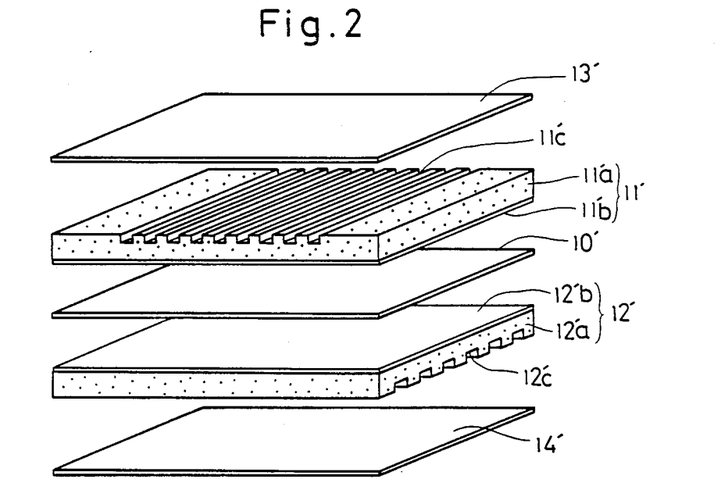
FIG. 2 is an exploded perspective view showing the cell structure of a phosphoric acid fuel cell, particularly a ribbed electrode fuel cell for which the electrode substrate of the present invention is applied.

The phosphoric acid fuel cell for which the electrode substrate of the present invention is preferably applied may be one having a cell structure as shown in FIG. 1 and FIG. 2. FIG. 1 shows one in which an electrode substrate shaped in flat plate is used, and FIG. 2 one in which a ribbed electrode substrate is used.

In FIG. 1, on one surface of a matrix layer 10 containing phosphoric acid electrolyte, and oxidative gas (air or oxygen gas) electrode, namely an air electrode 11 is superposed, while on the other surface a fuel gas (hydrogen gas, etc.) electrode, namely a fuel electrode 12 is superposed. The electrodes 11 and 12 are each constituted by the electrode substrate 11a, 12a, and catalyst layer 11b, 12b of platinum or platinum alloys supported on a carrier which is to be contacted with the matrix layer 10. Phosphoric acid fuel cell is constituted by stacking up a large number of cell units, each including matrix layer 10, air electrode 11 and fuel electrode 12, with gas separators 13, 14 interposed between the adjacent cell units. In the flat plate electrode type shown in FIG. 1, the oxidative gas and the fuel gas are respectively introduced into the grooves 13a (13b), 14a (14b) between the ribs formed on the gas separators 13, 14.

Also in the ribbed electrode cell structure shown in FIG. 2, similarly as the flat plate electrode of FIG. 1, air electrode 11' and fuel electrode 12' are superposed on both surfaces of the matrix layer 10' so as to sandwich it therebetween. The electrodes 11' and 12' are each constituted by the electrode substrate 11'a, 12'a, and catalyst layer 11'b, 12'b which is to be contacted with the matrix layer 10'. The ribbed electrode cell is constituted by stacking up a large number of units, each including matrix layer 10', air electrode 11' and fuel electrode 12' through gas separators 13', 14' shaped in flat plate, which are interposed between the adjacent cell units. In the case of the ribbed electrode cell, the oxidative gas and the fuel gas are respectively introduced into the grooves 11'c, 12'c between the ribs formed on the electrode substrates 11'a and 12'a.

In the following, the electrode substrate of the present invention is described along with its preferable production process.

In the present invention, the electrode substrate is constituted of a porous material, comprising short carbon fibers dispersed in random directions within substantially 2-dimensional plane bonded to each other with carbonoized resin.

The short carbon fiber may comprise any of polyacrylonitrile carbon fiber, pitch carbon fiber, rayon carbon fiber, etc. However, polyacrylonitrile carbon fiber with relatively higher mechanical strength is preferred. The short carbon fibers are generally obtained by cutting and splitting continuous fiber bundles. Fiber bundles are generally attached with a synthetic sheafing agent such as epoxy resin, etc., and such sheafing agent should be preferably removed for improvement of dispersibility in the paper making step as described below. When use of a sheafing agent is indispensable, it is preferable to use a water-soluble sheafing agent such as polyvinyl alcohol, polyethylene glycol, starch, etc.

The individual fiber of the chopped carbon fibers used has a diameters of from 4 to 9 $\mu$m. Preferable the diameter is in the range of from 4 to 8 $\mu$m. Here, the diameter, when the individual fiber has an ellipsoidal sectional shape, is represented by the simple average of its longer diameter and shorter diameter.

Figure 3:
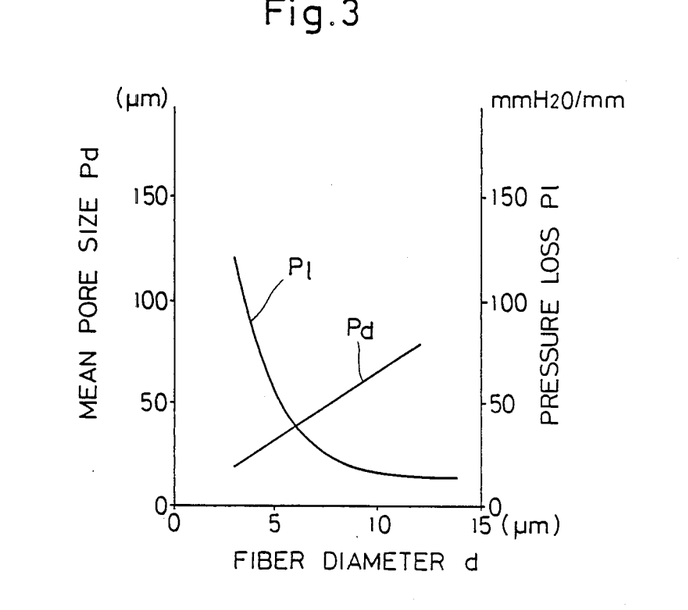
FIG. 3 is a graph showing the relationships of the diameter d of the individual chopped carbon fibers used in the electrode substrate with the mean pore size Pd and pressure loss Pl when a gas is flowed through the thickness direction of the substrate, in the case of using only a resol type phenolic resin as the resin impregnated to the carbon fiber mat.

The diameter of the individual chopped carbon fibers affects mean pore size, gas permeability, etc. of the substrate. In other words, as shown in FIG. 3, the mean pore size Pd ($\mu$m) of the substrate will be monotonously increased as the diameter d ($\mu$m) of the individual chopped carbon fibers is greater. On the other hand, the pressure loss Pl (mmH$_2$O/mm) when a gas is flowed through the thickness direction of the substrate will become acceleratedly smaller as the fiber diameter d is greater. Small pressure loss means good gas permeability. Good gas permeability is preferable for electrode substrate for phosphoric acid fuel cell, but if the mean pore size becomes too large, phosphoric acid solution as an electrolyte tends to be scattered as described above to be excessively consumed. On the other hand, if the fiber diameter becomes smaller, the average pore size Pd becomes smaller in proportion thereto. Whereas, if the average pore size becomes smaller, the pressure loss will become greater as a matter of course. In addition, phosphoric acid solution is penetrated as described above to lower further gas permeability of the electrode substrate, or the electrolyte in the matrix layer tends to become the shortage, thereby lowering cell performance. However, these inconveniences can be made negligible if the mean pore size is controlled within the range of from 20 to 60 $\mu$m. The diameter for obtaining the mean pore size of from 20 to 60 $\mu$m is in the range of from 4 to 9 $\mu$m from FIG. 3. However, mean pore size and gas permeability are dependent not only on the diameter of chopped carbon fibers, but on the various conditions as described below. Here, mean pore size is defined by the value of the maximum volume of the pore distribution measured by the known mercury pressure penetration method. On the other hand, gas permeability is evaluated by the pressure loss at gas flowing. More specifically, a sample of about 47 mm in diameter is cut out from the substrate provided for the test with a thickness of t (mm), and the sample is set on a sample holder. Next, the pressure difference $\Delta$P (mmH$_2$O) between the opposite sides of the sample is measured while nitrogen gas is caused to flow through the sample at a flow rate of 14 cm/sec. And, the pressure loss (mmH$_2$O/mm) during gas flowing is calculated from the following formula. The gas flowing through area is 11.94 cm$^2$.

Pressure loss during gas flowing = $\Delta P/t$

Figure 4:
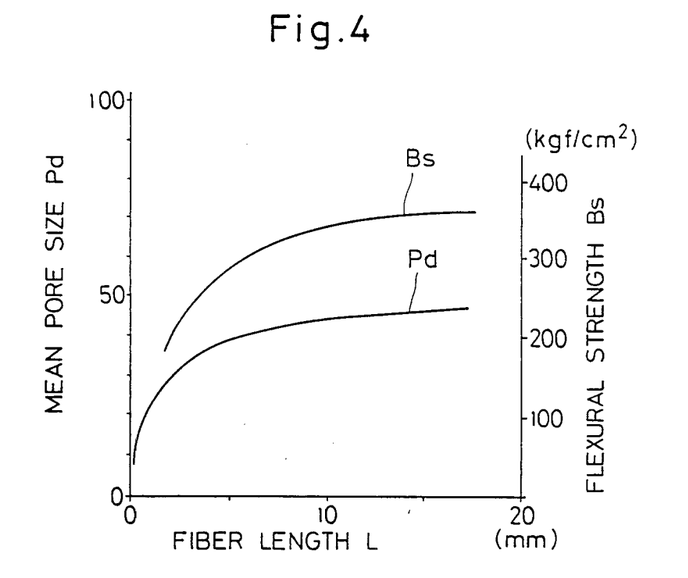
FIG. 4 is a graph showing the relationships of the fiber length L of the chopped carbon fibers used in the electrode substrate with the mean pore size Pd and the flexural strength Bs of the substrate, in the case of using only a resol type phenolic resin as the resin impregnated to the carbon fiber mat.

Fiber length of chopped carbon fibers affects mechanical strength such as flexural strength, mean pore size, distribution of pores, etc. of the electrode substrate. In other words, as shown in FIG. 4 for the case when the carbonized resin content in the substrate is 45% by weight, flexural strength Bs (kgf/cm$^2$) and mean pore size Pd ($\mu$m) will be increased as the fiber length L (mm) of chopped carbon fibers becomes longer. However, if the fiber length is too long, it is difficult to disperse the fibers uniformly, and therefore flexural strength will not be substantially increased. If dispersion of the fibers is non-uniform, sizes of pores will be irregular, and/or distribution of the pores will be non-uniform. On the other hand, if the fiber length L is shorter, not only the flexural strength Bs is greatly lowered, but also the fibers are too densely packed, failing to maintain the mean pore size of from 20 to 60 $\mu$m and the porosity of from 60 to 80%. In the present invention, by use of chopped carbon fibers with fiber lengths of from 3 to 20 mm, such inconveniences are avoided. Preferable fiber length is in the range of from 5 to 15 mm.

Measurement of porosity is conducted as described below. That is, previously, the respective weights of the glass bottle for measurement and the sample are weighed, and the measurement results are respectively made Wb and Ws. Further, ethanol is filled in the glass bottle and weighed, and the weight We of the ethanol filled is calculated. Next, the sample is placed in the glass bottle, the internal pressure of the glass bottle is decreased to a vacuum of 1 mmHg or lower, and then ethanol is filled in the bottle, followed by weighing. The result of weighing at this time is made Wbem, and the value obtained by detracting Wb from this value Wbem is made Wm (=Wbem−Wb). When the bulk density of the sample is made ρm, and the density of ethanol ρe, the porosity Pr (%) can be given by the following formula:

$$Pr = (1 - (We - Wm + Ws) \times \rho m / (Ws \times \rho e)) \times 100$$

However, the bulk density ρm (g/cm³) is calculated according to the following formula:

$$\rho m = Ws \times 10 / (t \times A)$$

Here, t is the thickness of the sample (mm), and A is the area of the sample (cm³).

Now, the chopped carbon fibers as described above are made into carbon fiber mat by means of continuously or batch wise. This carbon fiber mat is practiced by mixing and stirring chopped carbon fibers in a dispersant containing a binder for paper making, and the mixture is filtered onto a fabric or a wire net, etc. By means of paper making, the chopped carbon fibers are dispersed in random directions within substantially 2-dimensional plane, and bound to each other with the binder to be formed into a mat or a sheet having self-form retentivity. Here, as the organic binder for paper making, polyvinyl alcohol, hydroxyethyl cellulose, polyethylene oxide, polyacrylamide, polyester, etc. can be used, and the binder is diluted with a dispersant such as water or methanol, etc. The amount of the binder diluted may be in the range of from about 1 to about 30% by weight. The chopped carbon fibers and the dispersant may be mixed at a ratio which may also depend on the kind of the dispersant, etc., but preferably at a ratio of from about 0.01 to about 0.1% by weight of the chopped fibers.

After paper making, the dispersant is removed by drying with heating. The amount of the remaining binder with respect to the total weight of the carbon fiber mat dried may, after drying, be in the range of from 5 to 30% by weight, preferably 5 to 20% by weight.

The carbon fiber mat can be also obtained by the method other than that described above. For example, the above-mentioned chopped carbon fibers are dispersed in water as the dispersant to 0.01 to 0.1% by weight thereof, if desired, surfactants and an agent of increasing a viscosity of the dispersant such as sodium acrylate, sodium glycolate, etc. are added to improve a dispersibility, and paper making is carried out in the same manner as described above. Then, the above binder diluted with the solvent is attached to the resultant paper material by impregnation or spraying, thereby obtaining the carbon fiber mat.

Next, the carbon fiber mat which the chopped carbon fiber are bound to each other with a binder, make into a prepreg by means of impregnating a resin carbonizable by heat treatment. The resin may be, for example, a resol type phenolic resin. As the solvent for such resin, methanol and water can be used. This solvent is removed by drying with heating after impregnation.

Further, to produce an electrode substrate further improved in electroconductivity by lowering resistivity and yet also excellent in mechanical strength, it is preferable to use, as a resin to be impregnated, a mixture of a self-curable resin and non-self-curable resin mixed at an appropriate ratio. The self-curable resin is a resin which can be cured through condensation and/or addition reaction only by heating, while the non-self-curable resin is a resin which can be lowered in viscosity but not cured only by heating because it contains no curing agent.

As the self-curable resin, which is not particularly limited, resol type phenolic resins, thermosetting type polyimides, polyphenyl quinoxalines, etc. may be preferably used. As the non-self-curable resin, resins which will not be cured unless a curing agent and heating are used, and the resins which are not particularly limited, may include preferably novolak type phenolic resins, pitch, furan resins, epoxy resins, polyphenylene oxides, etc.

When a non-self-curable resin is impregnated together with a self-curable resin into the carbon fiber mat, electroconductivity of the substrate can be remarkably improved. The reason for remarkable improvement of electroconductivity may be that the non-self-curable resin is not cured even by heating but has fluidity with lowered viscosity as described above, and therefore even if voids are formed around the chopped carbon fibers by scattering of the binder which has bound the chopped carbon fibers to each other in the heat treatment step as descrbied later, the non-self-curable resin enters into the voids, thus embedding the voids.

It is preferably that the non-self-curable resin should be mixed at a proportion of 10 to 500 parts by weight based on 100 parts by weight of the self-curable resin. At a level less than 10 parts by weight, electronconductivity may not be improved sufficiently. On the other hand, if such a large amount as exceeding 500 parts by weight is used, the mixed resin cannot become sufficiently stiff even in the subsequent hot pressing step or hear treatment step, whereby the substrate becomes to have tackiness and adhered with other members, etc. to become difficult in handling. More preferably, the non-self-curable resin should be mixed at a proportion of 50 to 300 parts by weight based on 100 parts by weight of the self-curable resin.

Impregnation of the resin into the carbon fiber mat may be practiced by dipping the carbon fiber mat into a resin solution dissolved in a solvent such as water, methanol, tetrahydrofuran, dioxane, N-methylpyrrolidone, etc., or spraying the above resin solution onto the carbon fiber mat. The resin concentration of the solution used is preferably controlled to about 5 to 50% by weight, in view of easiness of impregnation. Then, the solvent is removed by heating.

The amount of the resin impregnated into the carbon fiber mat may be preferably about 80 to 500 parts by weight based on 100 parts by weight of the chopped carbon fibers in the carbon fiber mat. More preferable impregnation amount is in the range of from 100 to 350 parts by weight based on 100 parts by weight of the chopped carbon fibers.

Figure 5:
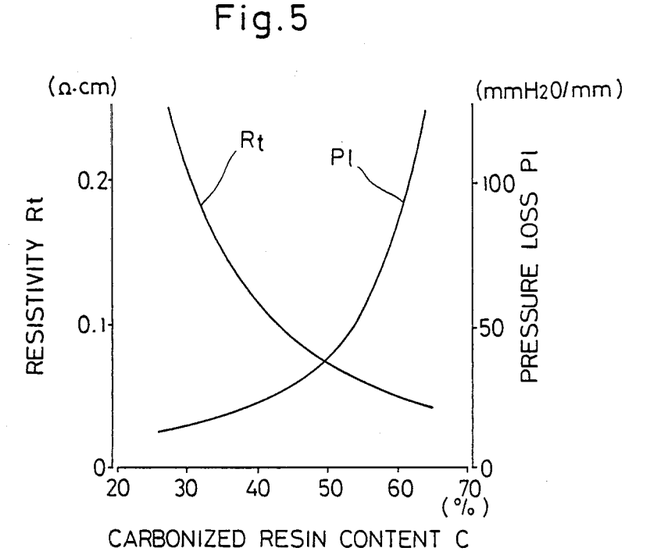
FIG. 5 is a graph showing the relationships of the carbonized resin content C in the electrode substrate with the resistivity Rt in the thickness direction and the pressure loss Pl in the thickness direction, in the case of using only a resol type phenolic resin as the resin impregnated to the carbon fiber mat.

The preferable range of the impregnated amount (attached amount) of the resin of the carbon fiber mat as described above is finally determined from the preferable range of the carbonized resin amount relative to the total amount of chopped carbon fibers. To describe this more specifically, the carbonized resin content in the electrode substrate affects electroconductivity, pressure loss, etc. of the substrate. More specifically, in the case of using only a resol type phenolic resin, as shown in FIG. 5, with the increase of the carbonized resin content C while the resistivity Rt (Ω·cm) in the thickness direction is acceleratedly lowered, the pressure loss Pl (mmH₂O/mm) during gas flowing through the thickness direction will be acceleratedly increased. Although lowering in resistivity is preferable, increase of pressure loss should be avoided because it will lower gas permeability as described above. Also, as the carbonized resin content becomes lowered, bindability between the chopped carbon fibers will be lowered, and also mechanical strength of the electrode substrate will be lowered. In the present invention, such inconveniences as described above are avoided by controlling the carbonized resin amount of 35 to 60% by weight based on the total amount of the chopped carbon fibers and carbonized resin. Thus, the amount of the resin attached on the carbon fiber mat is required to be controlled such that the carbonized resin content in the electrode substrate may become 35 to 60% by weight. The resistivity $Rt$ ($\Omega$·cm) in the thickness direction is calculated according to the following formula from the voltage drop $E$ (V) when the substrate with the thickness $t$ (mm) is sandwiched between mercury electrodes with a certain area $S$ (cm$^2$) and a certain current $I$ (A) is passed between the electrodes:

$$Rt=(E\times S)\times 10/(I\times t)$$

Also, when electricity generated is varied within the electrode plane, there is a fear that excessively great current may be passed through a part of the electrode to expedite consumption of the electrode. For solving this problem, the resistivity in the planar direction of the electrode should be preferably 20 m$\Omega$·cm or less, more preferably 15 m$\Omega$·cm or less.

The resistivity in the planar direction is measured as described below. That is, a sample of 25×50 mm is cut out from the substrate provided for the test, two measurement electrodes, each having a length of 25 mm and made of a copper plate plated with gold, are placed on the upper surface of the sample in parallel to the shorter side of the sample with an interval of 25 mm between the electrodes, a current of 1A is made flow between the measurement electrodes with a load of 5 kgf/cm$^2$ applied on each of the electrodes, and the voltage drop $E$ (mV) between the electrodes is measured. From the voltage drop measured, the resistivity $Ra$ (m$\Omega$·cm) is calculated from the following formula:

$$Ra=(E/I)\times t\times 10^{-1}$$

Here, $t$ is the thickness of the sample (mm), I is current value passed between the two measurement electrodes (A), namely 1A, and the measurement plane is 25 mm×25 mm. The resistance in the plane direction depends on the length of chopped carbon fibers, bindability mutually between the chopped carbon fibers, etc.

Figure 6:
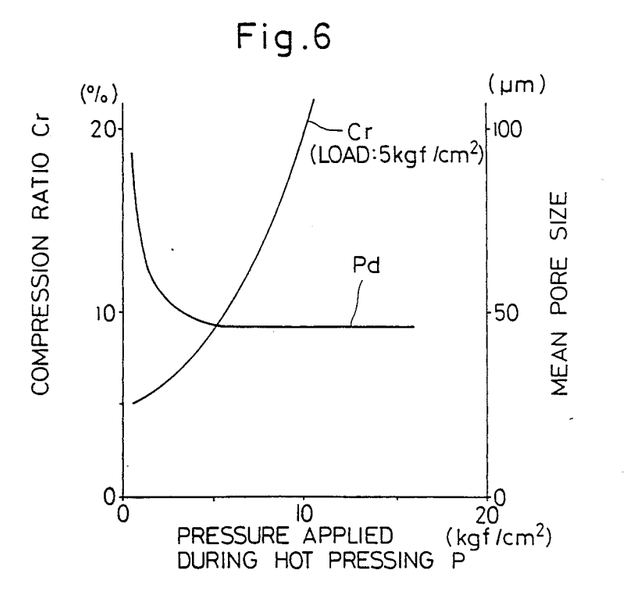
FIG. 6 is a graph showing the relationships of the pressure applied P during hot pressing of the mat prepreg with the mean pore size Pd of the substrate and the compression ratio Cr when a load of 5 kgf/cm² is applied on the substrate, in the case of using only a resol type phenolic resin as the resin impregnated to the carbon fiber mat.

The mat prepreg after resin impregnation is molded by hot pressing under a pressure of 2 to 10 kgf/cm$^2$ at 120° to 200° C. for about 5 to 60 minutes to cure the resin. At this stage, if desired, a plural number of mat prepregs are laminated on one another so as to obtain the necessary thickness. When a mixture of a self-curable and non-self-curable resins is used to obtain the mat prepreg, the self-curable resin of the mixture will be cured in the hot pressing step. The applied pressure during hot pressing affects compression ratio, mean pore size, etc. of the electrode substrate. FIG. 6 shows the relationship of the pressure P (kgf/cm$^2$) applied at hot pressing, with mean pore size Pd ($\mu$m) and the compression ratio Cr (%) measured under a condition of 5 kgf/cm$^2$ being applied to the substrate. As shown in FIG. 6, it was discovered that the compression ratio Cr becomes greater as the applied pressure P is higher. On the other hand, the mean pore size Pd becomes abruptly smaller as the applied pressure P becomes greater within the range when the applied pressure is relatively lower, but will not be changed so much thereafter. And, from this FIG. 6, it can be understood that an electrode substrate having a mean pore size of 20 to 60 $\mu$m and a compression ratio of 20% or less can be obtained when the applied force is 2 to 10 kgf/cm$^2$. In FIG. 6, the pressure applied to the substrate, i.e., 5 kgf/cm$^2$, is determined in view of the force applied when electrode substrates are practically superposed and used by clamping these. Compression ratio Cr is determined as follows. The electrode substrate is cut to 3 cm square, and 20 sheets thereof are superposed on one another to be placed on a metal plate, The thicknesses $t_1$, $t_2$, $t_3$, and $t_5$ of the sheets are measured under loading pressures of 1, 2, 3, and 5 kgf/cm$^2$, respectively, and the initial thickness $t_0$ under no loads is obtained by straight line approximation from the thicknesses $t_1$, $t_2$, and $t_3$ measured, Cr is calculated according to the following formula:

$$Cr=[(t_0-t_5)/t_0]\times 100$$

The molded substrate after hot pressing is then heat treated in an inert atmosphere such as nitrogen or argon or in vacuum atmosphere to 1300° to 3000° C. By this heat treatment, the resin previously impregnated is carbonized to become carbon or graphite. At this stage, the binder used during paper making will be pyrolyzed and dissipated. In the case of using a mixture of self-curable and non-self-curable resins, for example, a mixture of a resol type phenolic resin and a novolak type phenolic resin, the novolak type phenolic resin probably enters into the voids formed by dissipation before it is carbonized. Thus, the electrode substrate is obtained.

Figure 7:
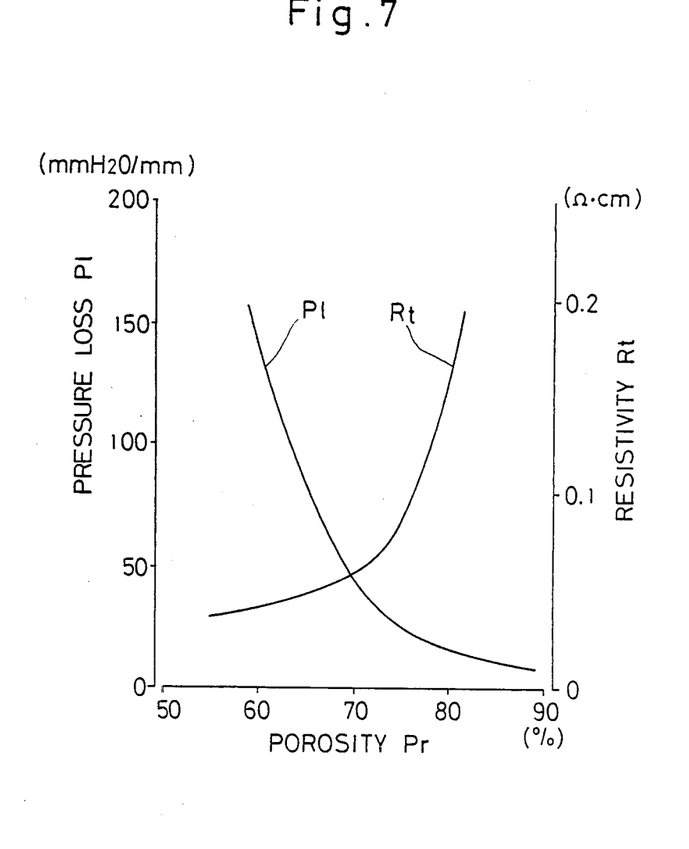
FIG. 7 is a graph showing the relationships of the porosity Pr of the substrate with the pressure loss Pl in the thickness direction and the resistivity Rt in the thickness direction, in the case of using only a resol type phenolic resin as the resin impregnated to the carbon fiber mat.

FIG. 7 shows, in the case of using only a resol type phenolic resin as the resin impregnated to the carbon fiber mat, the relationships of the porosity Pr (%) with the pressure loss Pl (mmH$_2$O/mm) in the thickness direction of the substrate and the resistivity $Rt$ ($\Omega$·cm) in the thickness direction. As is apparent from this FIG. 7, the pressure loss Pl will become acceleratedly smaller as the porosity Pr becomes larger to improve gas permeability, while on the other hand, the resistivity $Rt$ becomes acceleratedly greater to lower greatly the electroconductivity. On the other hand, if the porosity Pr exceeds 80%, bindability mutually between the chopped carbon fibers will be lowered, whereby not only electroconductivity but also mechanical strength will be lowered. To be used for the electrode substrate, the porosity is required to be 60 to 80%.

It is important to avoid power generation irregularity caused by planar variance of the amount of the catalyst coated on the electrode substrate surface, and avoid an increase in electrical resistance due to contact inferiority between the electroconductive gas separator intervening between the adjacent cell units and the electrode substrate when a large number of cell units are stacked up electrically in series. To this end, the surface roughness of the electrode substrate should preferably be 100 $\mu$m or less at the maximum undulation of the rolling circle.

The surface roughness of the substrate is related to diameter of individual chopped carbon fibers, length of individual chopped carbon fibers, dispersibility of chopped carbon fibers, etc. If the fiber diameter is large, the surface roughness becomes larger due to the planar variance of the amount attached during paper making of chopped carbon fibers. If the fiber length is too long, dispersibility during paper making also becomes poor to make the surface rough. When short, the above problem can be solved but the strength of the substrate is weakened. Short carbon fibers are generally obtained by cutting and splitting continuous fiber bundles, and the sheafing agent attached on the fiber bundles will generally worsen dispersibility in the paper making step, to consequently roughen the substrate surface. Preferably, no sheafing agent should be used, or it is preferable to use water or water-soluble sheafing agent. Also for realizing the above surface roughness of 100 μm or less, it is preferable that the chopped carbon fibers should have a diameter of from 4 to 9 μm and a length of from 3 to 20 mm in the individual fibers.

Measurement of the maximum undulation ($W_{EM}$) of the rolling circle on the substrate surface can be practiced according to the following method. As the measuring instrument, for example, a universal surface shape measuring instrument MODEL SE-3C produced by Kabushiki Kaisha Kosaka kenkyusho may be used. The contact needle which forms the detecting portion of this measuring instrument has a contact needle tip end radius of 800 μm and a contact apex angle of 60°, with the contact needle measuring load during measurement being 0.4 gf or less.

By fixing the substrate to be measured on a checker board with smooth surface and moving the above contact needle about 7 cm along the substrate surface, the shape of the surface can be measured. The difference between the maximum value and the minimum value of the wave form at the interval of 5 cm at the central portion of the movement length of the contact needle is defined as the maximum undulation of the rolling circle.

The electroconductive substrate thus prepared can be worked. For example, by forming grooves in parallel to each other on one surface of the substrate, a ribbed electrode substrate for phosphoric acid fuel cell can be provided.

EXAMPLES

Example 1

As shown in Table 1, various electrode substrates were prepared by varying the diameter of the individual chopped carbon fibers, fiber length of the individual chopped carbon fibers, amount of binder attached during paper making of carbon fiber mats, amount of resin attached, applied pressure during hot pressing, and heat treatment temperature. More specifically, for the substrates of the present invention Nos. 1–8 and comparative substrates Nos. C1–C6, polyacrylonitrile carbon fiber "TORAYCA" T300 (mean diameter of single filament: 7 μm, number of filaments: 6000) manufactured by Toray Industries, Inc. was used, for the substrate No. 9 of the present invention a polyacrylonitrile carbon fiber "TORAYCA" T800 (mean diameter of single filament: 5 μm, number of filaments: 6000) manufactured by Toray Industries, Inc., for the comparative substrate No. C7 a carbon fiber "Thornel" P25-W (mean diameter of single filament: 11 μm, number of filaments: 4000) manufactured by Union Carbide Corp., U.S.A., respectively, and the polyacrylonitrile carbon fibers were cut to the respective fiber lengths shown is Table 1, followed by sufficient fiber splitting. These chopped fibers were stirred in water, subjected to paper making on a wire net, and after drying, impregnated with an aqueous polyvinyl alcohol solution, followed by drying with heating to obtain an carbon fiber mat. The amounts of the polyvinyl alcohol attached were as shown in Table 1.

Next, each carbon fiber mat was impregnated with a 10% by weight of methanolic solution of a resol type phenolic resin (PR-9183B, manufactured by Sumitomo Durez K.K., represented by R in the table) to have the phenolic resin in parts by weight shown in Table 1 based on 100 parts by weight of the carbon fiber mat, and after drying at 90° C., subjected to hot pressing under the pressure and the temperature shown in Table 1 for 15 minutes to cure the phenolic resin.

Subsequently, the above molded substrate with the cured phenolic resin was carbonized by hedat treatment at the temperature shown in Table 1 in argon atmosphere to obtain an electrode substrate having the thickness, the bulk density, the mean pore size, the porosity, the compression ratio, the pressure loss, the planar resistivity, the resistivity in the thickness direction, the roughness, the flexural strength, and the heat resistance shown in Table 2.

TABLE 1

| Sample | | Fiber Diameter μm | Fiber Length mm | Amount of Binder Attached wt % | Resin | Amount of Resin Attached | Applied Pressure During Hot Pressing kgf/cm² | Heat Treatment Temperature °C. |
|---|---|---|---|---|---|---|---|---|
| Substrate of invention | No. 1 | 7 | 12 | 20 | R | 125/100 | 5 | 2500 |
| | No. 2 | 7 | 12 | 20 | R | 125/100 | 5 | 2500 |
| | No. 3 | 7 | 12 | 20 | R | 130/100 | 5 | 2500 |
| | No. 4 | 7 | 12 | 20 | R | 200/400 | 5 | 2500 |
| | No. 5 | 7 | 12 | 20 | R | 125/100 | 3 | 2500 |
| | No. 6 | 7 | 12 | 20 | R | 125/100 | 8 | 2500 |
| | No. 7 | 7 | 12 | 20 | R | 125/100 | 5 | 1800 |
| | No. 8 | 7 | 18 | 20 | R | 125/100 | 5 | 2500 |
| | No. 9 | 5 | 6 | 18 | R | 125/100 | 5 | 2500 |
| Substrate of Comparison | No. C1 | 7 | 12 | 20 | R | 86/100 | 5 | 2500 |
| | No. C2 | 7 | 12 | 20 | R | 370/100 | 5 | 2500 |
| | No. C3 | 7 | 12 | 20 | R | 125/100 | 1 | 2500 |
| | No. C4 | 7 | 12 | 20 | R | 125/100 | 12 | 2500 |
| | No. C5 | 7 | 1 | 20 | R | 125/100 | 5 | 2500 |
| | No. C6 | 7 | 30 | 20 | R | 125/100 | 5 | 2500 |
| | No. C7 | 11 | 6 | 23 | R | 125/100 | 5 | 2500 |

TABLE 2

| Sample | | Carbonized Resin Content wt % | Thickness mm | Bulk Density g/cm³ | Mean Pore Size μm | Porosity % | Compression Ratio % | Resistivity Thickness Direction[1] | Resistivity Planar Direction[2] | Pressure Loss mmH₂O/mm | Flexural Strength kgf/cm² | Roughness μm | Heat Resistance wt % |
|---|---|---|---|---|---|---|---|---|---|---|---|---|---|
| Substrate of Invention | No. 1 | 45 | 0.4 | 0.43 | 45 | 76 | 8 | 0.1 | 13 | 27 | 300 | 65 | <1 |
| | No. 2 | 48 | 3.2 | 0.45 | 40 | 75 | 9 | 0.08 | 11 | 32 | 150 | 70 | <1 |
| | No. 3 | 40 | 0.3 | 0.40 | 55 | 78 | 12 | 0.12 | 8 | 23 | 250 | 67 | <1 |
| | No. 4 | 50 | 0.3 | 0.55 | 45 | 69 | 10 | 0.07 | 9 | 55 | 270 | 82 | <1 |
| | No. 5 | 45 | 0.36 | 0.37 | 50 | 79 | 11 | 0.08 | 8 | 21 | 300 | 71 | <1 |
| | No. 6 | 45 | 0.34 | 0.38 | 50 | 78 | 15 | 0.13 | 8 | 21 | 280 | 59 | <1 |
| | No. 7 | 46 | 0.28 | 0.46 | 45 | 74 | 7 | 0.11 | 7 | 34 | 260 | 61 | <1 |
| | No. 8 | 46 | 0.4 | 0.38 | 50 | 79 | 10 | 0.11 | 11 | 22 | 280 | 73 | <1 |
| | No. 9 | 47 | 0.1 | 0.43 | 30 | 76 | 10 | 0.09 | 7 | 25 | 300 | 55 | <1 |
| Substrate of Comparison | No. C1 | 30 | 0.41 | 0.29 | 55 | 84 | 23 | 0.22 | 25 | 10 | 110 | 74 | <1 |
| | No. C2 | 65 | 0.33 | 0.85 | 38 | 43 | 7 | 0.05 | 6 | 120 | 330 | 68 | <1 |
| | No. C3 | 43 | 0.45 | 0.33 | 70 | 81 | 6 | 0.08 | 7 | 11 | 150 | 70 | <1 |
| | No. C4 | 44 | 0.38 | 0.51 | 40 | 72 | 22 | 0.10 | 12 | 42 | 120 | 56 | <1 |
| | No. C5 | 48 | 0.42 | 0.45 | 25 | 77 | 12 | 0.11 | 22 | 73 | 90 | 62 | <1 |
| | No. C6 | 45 | 0.44 | 0.47 | 43 | 74 | 10 | 0.13 | 7 | 32 | 320 | 120 | <1 |
| | No. C7 | 47 | 0.41 | 0.48 | 78 | 73 | 25 | 0.12 | 23 | 12 | 130 | 125 | <1 |

[1] Ω·cm
[2] mΩ·cm

The substrates Nos. 1 and 2 of the present invention differ in thickness of the substrate, the substrates Nos. 1, 3, 4 of the present invention and comparative substrates Nos. C1, C2 in the carbonized resin content in the substrate prepared, the substrates Nos. 1, 5, 6 of the present invention and comparative substrates Nos. C3, C4 in applied pressure during hot pressing, the substrates Nos. 1 and 7 of the present invention in heat treatment temperature, the substrates Nos. 1–9 of the present invention and comparative substrates Nos. C5–C7 in length and/or diameter of individual chopped carbon fibers from each other, respectively.

Figure 8:
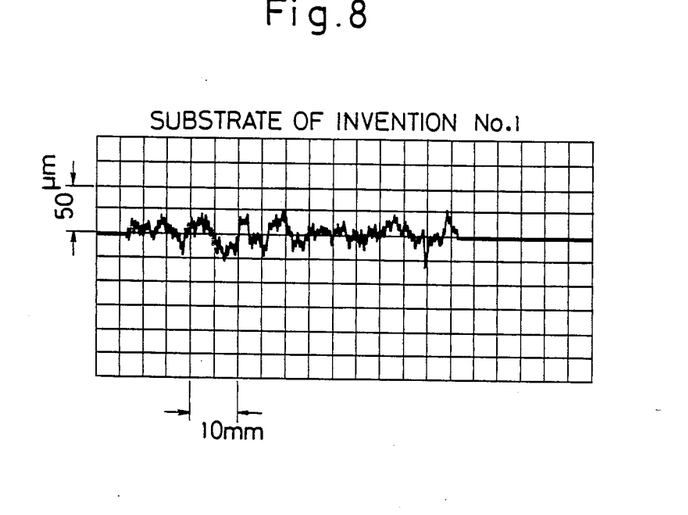
FIG. 8 is a graph showing the surface roughness of the electrode substrate of the present invention.
Figure 9:
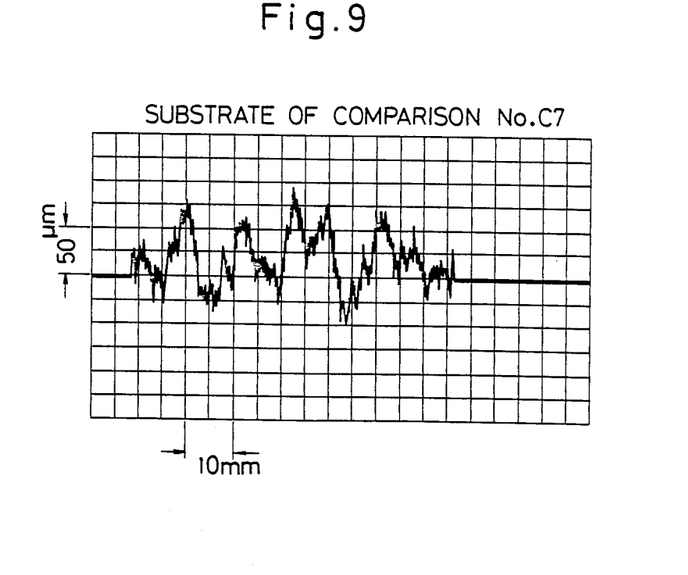
FIG. 9 is a graph showing the surface roughness of the electrode substrate of the comparative example.

For the substrate No. 1 of the present invention and comparative substrate No. C7 shown in Table 1, the substrate surface roughness was measured by use of the universal surface shape measuring instrument MODEL SE-3C produced by Kabushiki Kaisha Kosaka Kenkyusho as mentioned above. The substrate surface shape of each sample was subjected to measurement of the respective two points at any desired direction of the substrate surface (0°) and at the direction perpendicular thereto, from which the averaged maximum undulation of the rolling circle was determined. FIG. 8 and FIG. 9 show the substrate surface shapes of the substrate No. 1 of the present invention and comparative substrate No. C7, respectively. The averaged maximum undulation $W_{EM}$ of the rolling circle of the substrate No. 1 of the present invention was 65 μm, when the rolling circle radius was 800 μm. On the other hand, the averaged maximum undulation $W_{EM}$ of the rolling circle of the comparative substrate No. C7 was 125 μm.

Heat resistance of the substrate provided for the test was evaluated by the weight reduction of the sample determined as described below. More specifically, by use of a super-heating weight reduction testing device (Thermal Analyzer BT-30 produced by Shimazu Corp.), the sample was maintained in an air atmosphere of 390° C. for 12 hours and the weight reduction of the sample was measured. The initial weight of the measured sample was set at around 10 mg.

Flexural strength was measured according to the three point flexural test by use of "Autograph" IS2000 produced by Shimazu Corp. under the conditions shown in the following table.

| Sample Thickness | Span mm | Indenter Diameter mm | Fulcrum Diameter mm | Loading Speed of Load mm/min |
| --- | --- | --- | --- | --- |
| 0.2 mm or less | 50 | 3 | 3 | 1 |
| 0.2 mm or more | 7 | 0.75 | 0.75 | 5 |

Here, span is the distance between fulcrums, indenter diameter is the radius of curvature of the indenter for applying the load on the sample at the contacted portion with the sample, the fulcrum diameter is the radius of curvature of the fulcrum for supporting the sample at the contacted portion with the sample, and the loading speed of load is the falling speed of the crosshead supporting the indenter, and the load corresponding to the falling amount is applied through the indenter on the sample. Flexural strength was determined from the load on breaking of the sample.

TABLE 3

| Sample | | Fiber Diameter μm | Fiber Length mm | Amount of Binder Attached wt % | Resin | Amount of Resin Attached | Applied Pressure During Hot Pressing kgf/cm² | Heat Treatment Temperature °C. |
| --- | --- | --- | --- | --- | --- | --- | --- | --- |
| Substrate of Invention | No. 11 | 7 | 12 | 30 | N:R = 0:1 | 155/100 | 5 | 1600 |
| | No. 12 | 7 | 12 | 30 | N:R = 1:3 | 155/100 | 5 | 1600 |
| | No. 13 | 7 | 12 | 30 | N:R = 1:2 | 155/100 | 5 | 1600 |
| | No. 14 | 7 | 12 | 30 | N:R = 1:1 | 155/100 | 5 | 1600 |
| | No. 15 | 7 | 12 | 30 | N:R = 2:1 | 155/100 | 5 | 1600 |
| | No. 16 | 7 | 12 | 30 | N:R = 1:1 | 155/100 | 5 | 2500 |
| | No. 17 | 7 | 12 | 30 | N:R = 1:1 | 155/100 | 5 | 2500 |
| | No. 18 | 7 | 12 | 30 | N:R = 2:1 | 155/100 | 5 | 2500 |
| | No. 19 | 7 | 12 | 30 | N:R = 3:1 | 155/100 | 5 | 2500 |
| | No. 20 | 7 | 12 | 30 | N:R = 1:10 | 125/100 | 5 | 1600 |
| | No. 21 | 7 | 12 | 30 | P:R = 1:4 | 125/100 | 5 | 1600 |
| | No. 22 | 7 | 12 | 30 | A | 125/100 | 5 | 1600 |
| | No. 23 | 7 | 12 | 30 | A | 125/100 | 5 | 2500 |

TABLE 4

| Sample | | Carbonized Resin Content wt % | Thickness mm | Bulk Density g/cm³ | Mean Pore Size μm | Porosity % | Compression Ratio % | Resistivity Thickness Direction[1] | Resistivity Planar Direction[2] | Pressure Loss mmH₂O/mm | Flexural Strength kgf/cm² | Roughness μm | Heat Resistance wt % |
|---|---|---|---|---|---|---|---|---|---|---|---|---|---|
| Substrate of Invention | No. 11 | 46 | 0.33 | 0.46 | 40 | 73 | 9 | 0.15 | 8 | 33 | 220 | 74 | 17 |
| | No. 12 | 46 | 0.32 | 0.45 | 40 | 74 | 7 | 0.13 | 8 | 31 | 210 | 68 | 18 |
| | No. 13 | 47 | 0.31 | 0.45 | 40 | 74 | 7 | 0.12 | 9 | 32 | 200 | 58 | 17 |
| | No. 14 | 47 | 0.30 | 0.45 | 40 | 73 | 8 | 0.08 | 8 | 32 | 250 | 63 | 17 |
| | No. 15 | 48 | 0.28 | 0.44 | 40 | 74 | 8 | 0.07 | 7 | 30 | 250 | 72 | 17 |
| | No. 16 | 47 | 0.25 | 0.47 | 35 | 74 | 8 | 0.06 | 7 | 35 | 270 | 71 | <1 |
| | No. 17 | 48 | 1.9 | 0.52 | 40 | 71 | 7 | 0.05 | 10 | 47 | 300 | 73 | <1 |
| | No. 18 | 47 | 0.35 | 0.49 | 40 | 73 | 8 | 0.05 | 6 | 43 | 280 | 66 | <1 |
| | No. 19 | 49 | 0.33 | 0.55 | 35 | 69 | 7 | 0.04 | 7 | 54 | 250 | 77 | <1 |
| | No. 20 | 49 | 0.35 | 0.49 | 40 | 73 | 11 | 0.08 | 10 | 43 | 210 | 88 | 16 |
| | No. 21 | 50 | 0.31 | 0.47 | 40 | 74 | 10 | 0.07 | 9 | 36 | 200 | 63 | 17 |
| | No. 22 | 48 | 0.39 | 0.47 | 40 | 74 | 8 | 0.12 | 11 | 35 | 250 | 83 | 14 |
| | No. 23 | 50 | 0.26 | 0.55 | 35 | 69 | 7 | 0.08 | 7 | 56 | 220 | 79 | <1 |

[1] Ω · cm
[2] mΩ · cm

Example 2

As shown in Table 3, various electrode substrates were prepared by varying the resin impregnated into the carbon fiber mats formed by means of paper making and the heat treatment temperature. More specifically, for all of these substrates, the polyacrylonitrile carbon fiber "TORAYCA" T300 manufactured by Toray Industries, Inc. as described above was used, and sufficiently splitted after cutting into length of 12 mm. The splitted chopped fibers were dispersed to 0.04% by weight thereof in water, subjected to paper making on a wire net, further the resultant paper was dipped in an aqueous 10% by weight of polyvinyl alcohol solution, pulled up and dried to obtain a carbon fiber mat with attachment of about 30% by weight of polyvinyl alcohol as a binder.

Next, various mixed resins at mixing ratios shown in Table 3 were impregnated into the carbon fiber mats, to have about 155 parts by weight of mixed resins attached per 100 parts by weight of the chopped carbon fibers in all of the carbon fiber mats. For the substrates Nos. 11-19 of the present invention, mixed resins of a resol type phenolic resin (PR-9183B manufactured by Sumitomo Durez K.K. as mentioned above) and a novolak type phenolic resin (KP-759S manufactured by Arakawa Kagaku Kogyo K.K. represented by N in the table), and for the substrates No. 20 and No. 21 of the present invention, mixed resins of a resol type phenolic resin (PR-9183B manufactured by Sumitomo Durez K.K. as mentioned above) and pitch were employed, respectively. For the substrates Nos. 22 and 23 of the present invention, a resol type phenolic resin (KP-743K manufactured by Arakawa Kagaku Kogyo K.K. represented by A in the table) was singly employed. The carbon fiber mat was dipped in 10% by weight of methanolic solution of these resins to be impregnated with the resin(s). However, for the substrates Nos. 20 and 21 of the present invention, 15% by weight of tetrahydrofuran solution of the above mixed resins was impregnated. Next, after the impregnation, those were dried at 90° C. for 3 minutes to obtain a prepreg, and then two sheets of the prepreg were superposed on one another and subjected to hot pressing under a temperature of 170° C. by application of a pressure of 5 kgf/cm$^2$ for 15 minutes to cure the resol type phenolic resin to obtain a molded substrate.

Next, the above molded substrate was carbonized by heat treatment at the temperature shown in Table 3 in argon atmosphere for 30 minutes, and obtain the electrode substrates having the thickness, the bulk density, the mean pore size, the porosity, the compression ratio, the pressure loss, the resistivity in the planar direction, the resistivity in the thickness direction, the roughness, the flexural strength, and the heat resistance shown in Table 4.

All of the substrates Nos. 11-23 of the present invention shown in Table 3 and Table 4 satisfy the ranges of carbonized resin content, pore size, porosity and compression ratio as defined by the present invention. Further, electroconductivity of the electrode substrate of the present invention could be improved by increasing the mixing ratio of the non-self-curable resin in the resin solution impregnated into the carbon fiber mat.

What is claimed is:

1. A porous electrode substrate for fuel cell comprising short carbon fibers dispersed in random directions within substantially 2-dimensional plane and carbonized resin for mutually bonding said carbon fibers, the individual fiber of said carbon fibers having a diameter of from 4 to 9 μm and a length of from 3 to 20 mm, the content of said carbonized resin being in the range of from 35 to 60% by weight, said substrate having pores with a mean pore size of from 20 to 60 μm and a porosity of from 60 to 80%, and a compression ratio not more than 20%.

2. The electrode substrate according to claim 1, wherein an individual fiber of said carbon fibers has a diameter of from 4 to 8 μm.

3. The electrode substrate according to claim 1, wherein an individual fiber of said carbon fibers has a length of from 5 to 15 mm.

4. The electrode substrate according to claim 1, wherein a surface of said substrate has a surface roughness of not more than 100 μm, defined as the maximum undulation of the rolling circle tracing the shape of said substrate surface.

5. The electrode substrate according to claim 1, wherein a resistivity in the planar direction of said substrate is not more than 20 mΩ·cm.

* * * * *

UNITED STATES PATENT AND TRADEMARK OFFICE
CERTIFICATE OF CORRECTION

PATENT NO. : 4,851,304

DATED : July 25, 1989

INVENTOR(S) : Kishio Miwa, Kazuharu Shimizu and Hiroaki Fukui

It is certified that error appears in the above-identified patent and that said Letters Patent is hereby corrected as shown below:

On the title page:

In the Abstract, line 1, after "for" insert --a--; line 8, after "within" insert --a--.

Column 1, line 7 after "for" insert --a--; line 7, before "phosphoric" insert --a--; line 9, change "cell is constituted of" to --cells constitute--; line 13, change "constituted" to --made--; line 16, before "phosphoric" insert --a--; line 17, change "demanded" to --required--; line 23, before "phosphoric" insert --a--; line 29, after "by" insert --the--; line 39, change "penetrate" to --penetrates--; line 44, delete "of"; line 47, delete "a"; line 49, change "in" to --as a--; and line 67, change "be also" to --also be--.

Column 2, line 64 change "Primary" to --A primary--.

Column 3, line 16 after "for" insert --a--; and line 18, after "within" insert --a--.

Column 20, line 21 (claim 1, first line) after "for" insert --a--; column 20, line 4 (claim 1, fourth line) change "the" to --an--; and

UNITED STATES PATENT AND TRADEMARK OFFICE
CERTIFICATE OF CORRECTION

PATENT NO. : 4,851,304

DATED : July 25, 1989

INVENTOR(S) : Kishio Miwa, Kazuharu Shimizu and Hiroaki Fukui

It is certified that error appears in the above-identified patent and that said Letters Patent is hereby corrected as shown below:

Column 20, line 41 (claim 4, fourth line) change "the" to --a--.

Signed and Sealed this

Seventh Day of August, 1990

Attest:

HARRY F. MANBECK, JR.

*Attesting Officer*  *Commissioner of Patents and Trademarks*